A. MARCH.
Draft-Equalizers.
No. 148,837.  Patented March 24, 1874.
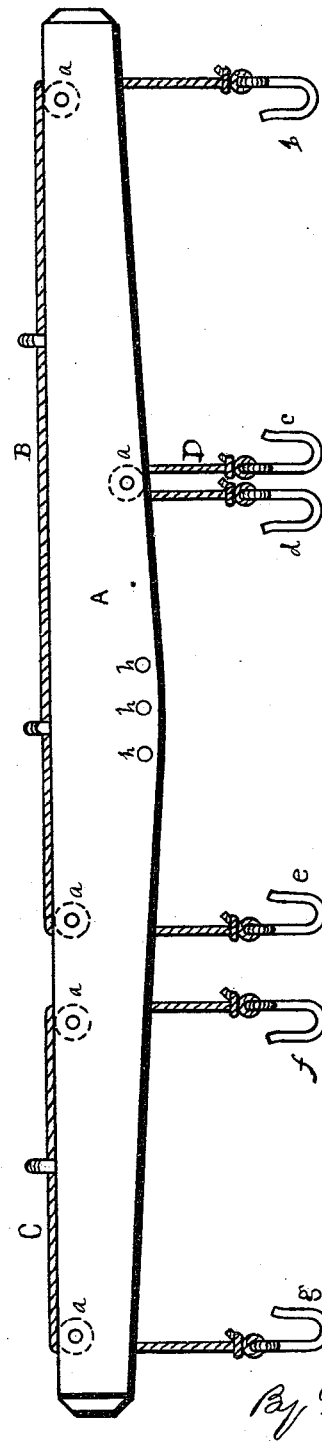
Witnesses
O. W. Bond
Wm Westlake
Inventor
Aaron March
By West & Bond Attys.

UNITED STATES PATENT OFFICE.

AARON MARCH, OF OREGON, ILLINOIS.

IMPROVEMENT IN DRAFT-EQUALIZERS.

Specification forming part of Letters Patent No. 148,837, dated March 24, 1874; application filed January 23, 1874.

*To all whom it may concern:*

Be it known that I, AARON MARCH, of the town of Oregon, in the county of Ogle and State of Illinois, have invented certain new and useful Improvement in Draft-Equalizers for Horses, of which the following is a full description, reference being had to the accompanying drawings, in which—

Figure 1 is a top or plan view.

In the equalizer patented to me March 19, 1872, the connecting cords or chains were so arranged that each horse partly balanced the other two by them, which arrangement has given good results and satisfaction when the horses were of nearly equal size and power, but when they were unequal it was not so satisfactory, and the object of this improvement is to remedy this difficulty; and the nature of the invention consists in so arranging the connecting-cords that one horse may be separated from the other two and the pivotal bolt be adjusted to accommodate any size or power of the third horse.

In the drawings, A indicates the main bar or double-tree; B, the long cord or chain; C, the single or detached cord; and D, the intermediate one; $a$, anti-friction pulleys; $b, c, d, e, f,$ and $g$, hooks to which the harness-tugs are to be attached. The bar A is made of wood, and I usually insert the pulleys in suitable recesses or mortises made in the bar for that purpose, and bore holes for the passage of the chains, but if desired the pulleys and chains or cords may be arranged on the top thereof. I also make several holes, $h$, for the pivotal bolt, so that the leverage may be changed to suit lighter or heavier horses. The cords B, C, and D, are usually made of chains, and are provided at their ends with suitable snap or other hooks or eyes. A portion of the cords B and C may be made of iron rods, if desired. In use the heavier horses are placed between the hooks $b\ c$ and $d\ e$, and the lighter one between the hooks $f\ g$. By this arrangement the draft of the heavy horses is equalized between them on the cords, and between them and the light horse by adjusting the pivot-bolt, and I thereby secure a perfect equalization between horses of unequal weight or power, and also dispense with whiffletrees, so as to bring the horses nearer their work. By lengthening the bar A and duplicating the arrangement of the cords B and D, and placing the pivot-bolt between the two sets, I make a four-horse equalizer. I am aware that providing a double-tree with a series of holes to change the leverage is old, by itself. By this arrangement the lighter horse is placed upon an independent draft, which may be equalized by changing the point of draft in the holes $h$, while the two heavier horses' draft is equalized with each other.

Having thus fully described my invention, what I claim, and desire to secure by Letters Patent, is—

The perforated bar A, cord or chain C, having hooks, and cords or chains B D, having hooks, combined substantially as and for the purpose herein specified.

AARON MARCH.

Witnesses:
EDWARD F. DUTCHER,
S. D. WALLACE.